US006592241B1

(12) United States Patent
Kovacik et al.

(10) Patent No.: US 6,592,241 B1
(45) Date of Patent: Jul. 15, 2003

(54) ARTICULATED ARM LIGHT

(75) Inventors: James D. Kovacik, Brecksville, OH (US); Paul S. Blanch, Broadview Heights, OH (US); Joseph J. Smith, Wooster, OH (US)

(73) Assignee: Alert Safety Lite Products Co, Inc., Bedford Heights, OH (US)

(*) Notice: Subject to any disclaimer, the term of this patent is extended or adjusted under 35 U.S.C. 154(b) by 0 days.

(21) Appl. No.: 10/146,869

(22) Filed: May 16, 2002

(51) Int. Cl.[7] ................................................ F21V 21/28

(52) U.S. Cl. ....................... 362/419; 362/275; 362/398; 362/401; 362/427; 362/285; 362/287; 362/414

(58) Field of Search ................................ 362/419, 275, 362/398, 427, 401, 402, 287, 285, 413, 384, 410, 414

(56) References Cited

U.S. PATENT DOCUMENTS 4,494,177 A 1/1985 Matthews
4,517,632 A * 5/1985 Roos .......................... 362/389
4,774,647 A 9/1988 Kovacik et al.
4,965,708 A * 10/1990 Louis ......................... 362/398
5,016,153 A * 5/1991 Gismondi et al. .......... 362/402
5,097,400 A * 3/1992 Cvek .......................... 362/287
5,303,136 A 4/1994 Brown
5,548,496 A 8/1996 Hart et al.

* cited by examiner

*Primary Examiner*—Sandra O'Shea
*Assistant Examiner*—Mark Tsidulko
(74) *Attorney, Agent, or Firm*—MacMillan Sobanski & Todd, LLC

(57) ABSTRACT

A light apparatus includes a base for engaging a planar support surface and rotatably mounting a base adapter for rotation about a first axis. An articulated arm extends between the base adapter and a lamp head. The arm has a lower arm section rotatably attached to the base adapter for rotation about a second axis generally perpendicular to the first axis and having an upper end and rotatably attached to an upper arm section for rotation about a third axis generally perpendicular to the first axis. An upper connector is rotatably attached to an upper end of the upper arm section for rotation about a fourth axis perpendicular to the third axis and the lamp head is rotatably attached to the upper connector for rotation about a fifth axis generally perpendicular to the first axis.

14 Claims, 5 Drawing Sheets

10 11 12 13 14 15 16 17 18 19 28 29 30 31 32 36 37 38 39 40 41 43 44 45 48 49 50 51 52 54 59 62 63 64 65 66 67 68

10
11
12
13
14
15
16
17
18
19
28
29
30
31
32
36
37
38
39
40
41
43
44
45
48
49
50
51
52
54
59
62
63
64
65
66
67
68

62
65
12
10
39
66
67
48
46
45
47
13
41
43

30
28
29
35
34
33
19
36
18
16
11
15
21
14
14
14
14

39
41b
44
45
40
47
46
49
41a
41
44b
44a
42
43
30
13
28
29
31
34
33
35
16
17
19
17b
20
37
21
18a
18
17a
18b
23
15
11
25
23a
14
26
14
24
S
S
27
22

12
12b
65
51
53a
59
61
60
69
63
65
56
62
52
55
53b
57
58
53
39

48
13
41b
40
45
47
46
44b
49
41
44
28
30
31
34
16
29
19

ARTICULATED ARM LIGHT

BACKGROUND OF THE INVENTION

The present invention relates generally to a portable light and, in particular, to an articulated arm light apparatus.

Portable lights, which can be manually moved and suspended about a work site to aid a user to obtain the best lighting conditions, are well known. It has been the practice to use incandescent light bulbs, suitably encased in light guards, for this purpose. Such lights are often referred to as trouble lamps, extension lights, work lights, inspection lights, utility lights, and the like, and are commonly employed by mechanics and other workers who require a concentration of light while frequently changing locations. Such a trouble light is shown in the U.S. Pat. No. 4,774,647 to Kovacik et al.

The U.S. Pat. No. 4,494,177 shows an articulated task lamp for use as a counterbalanced drafting table lamp. The lamp has two support arms pivotally connected between a clamp base and a lamp head. The lamp also utilizes a torsion counterbalance spring in the base to retain the lamp head in a selected position.

The U.S. Pat. No. 5,016,153 shows an articulated arm table lamp with two arms and a flexible support element that also conducts electrical current to the lamp head.

The U.S. Pat. No. 5,303,136 shows an articulated lamp having a vertical support arm and a transverse support arm connected to a lamp head by a universal joints.

The U.S. Pat. No. 5,548,496 shows a portable lamp assembly with a lamp housing and a U-shaped support bracket, and having a clamp functioning as a third leg or an attachment means.

SUMMARY OF THE INVENTION

The present invention concerns an articulated arm light apparatus including a base adapted to engage a planar support surface and a base adapter rotatably mounted on the base for rotation about a first axis. The base can have legs or a disk magnet for engaging the support surface. A lower arm section has a lower end rotatably attached to the base adapter for selective rotation about a second axis generally perpendicular to the first axis and has an upper end. An upper arm section has a lower end rotatably attached to the upper end of the lower arm section for rotation about a third axis generally perpendicular to the first axis and has an upper end. An upper connector is rotatably attached to the upper end of the upper arm section for rotation about a fourth axis perpendicular to the third axis. A lamp head is rotatably attached to the upper connector for rotation about a fifth axis generally perpendicular to the first axis. Thus, the light apparatus according to the present invention has up to five degrees of adjustment for the lamp head relative to the base.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
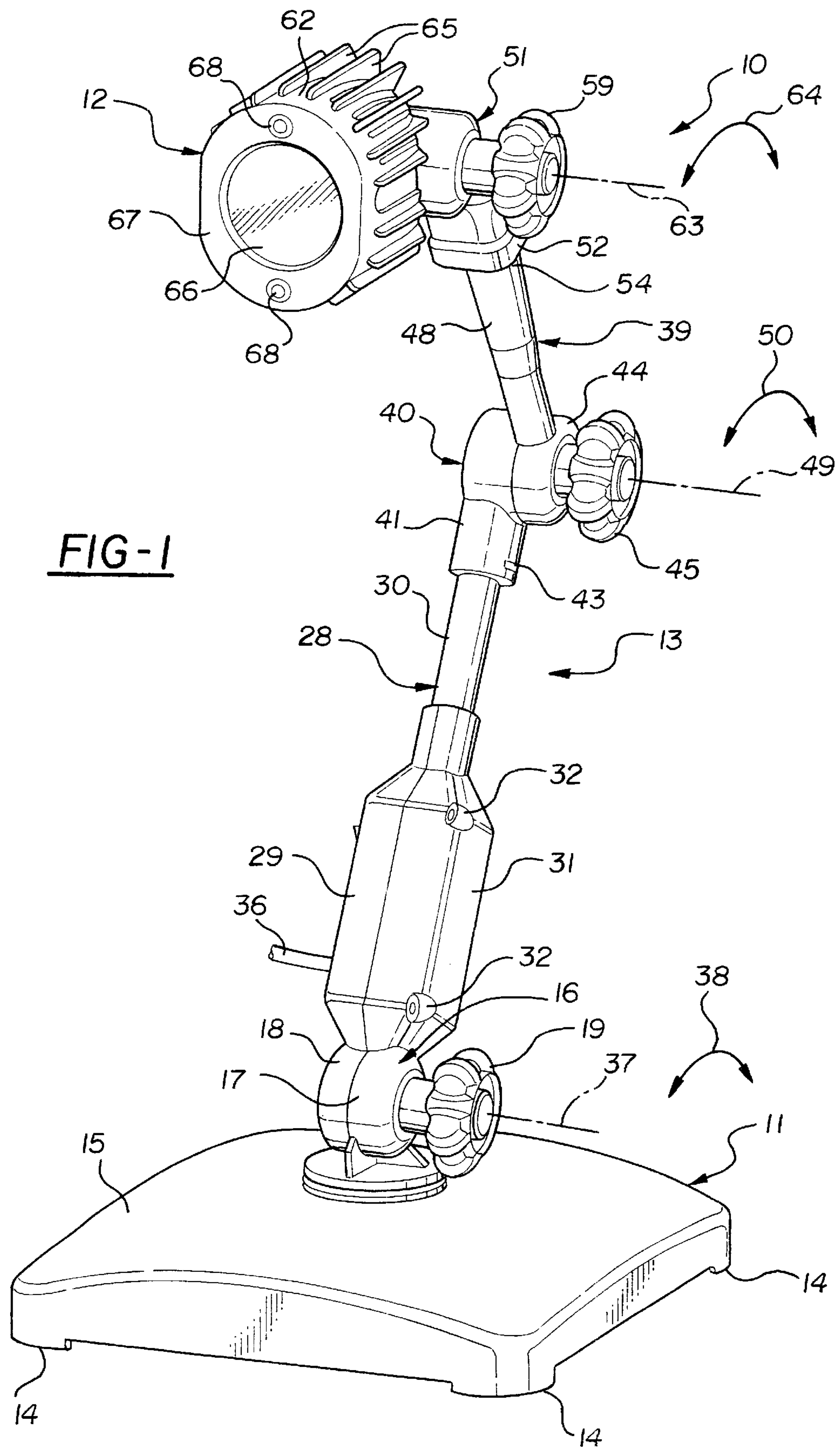
FIG. 1 is a front perspective view of an articulating arm light apparatus in accordance with the present invention.
Figure 2:
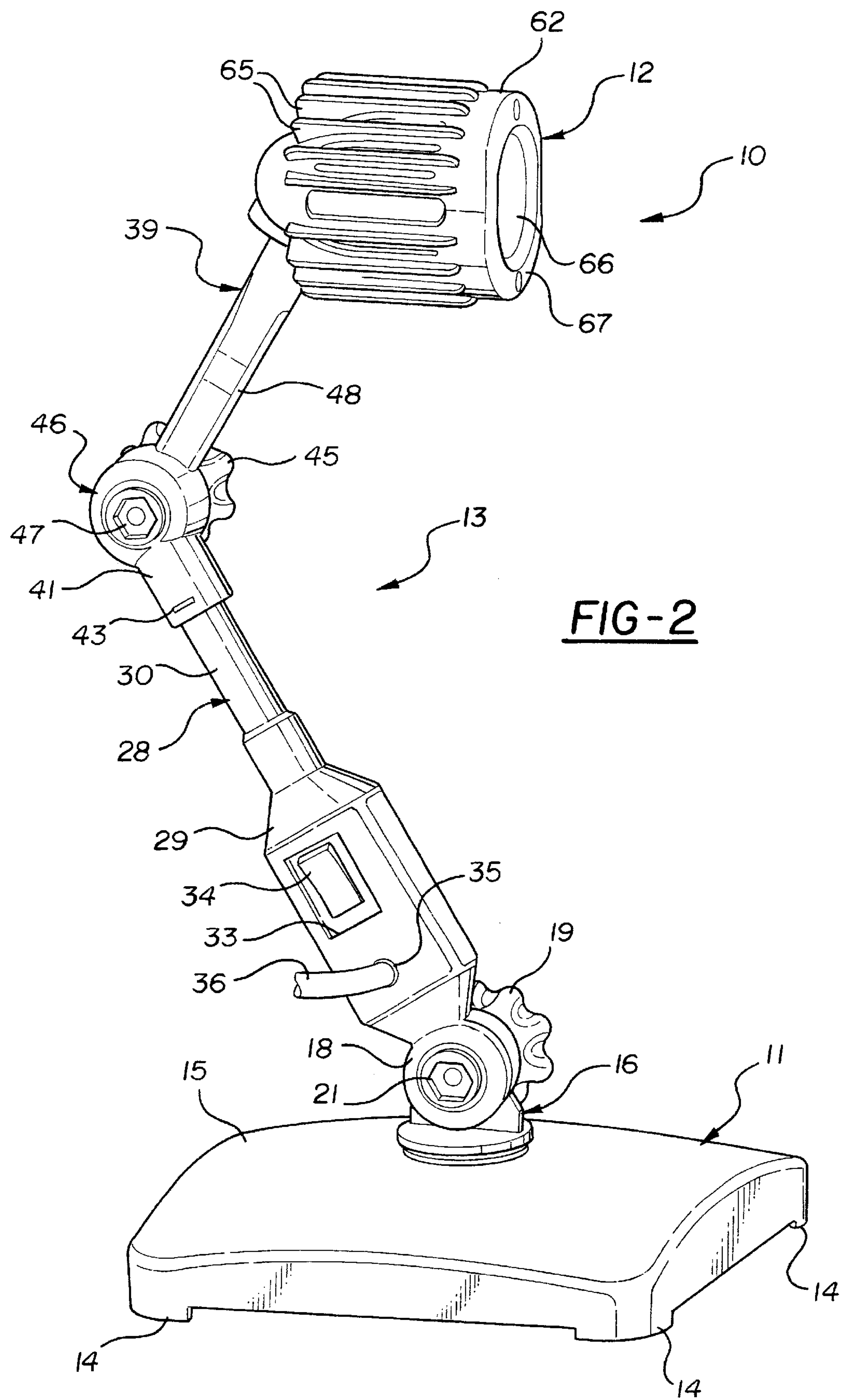
FIG. 2 is a left side perspective view of the light apparatus shown in FIG. 1.
Figure 3:
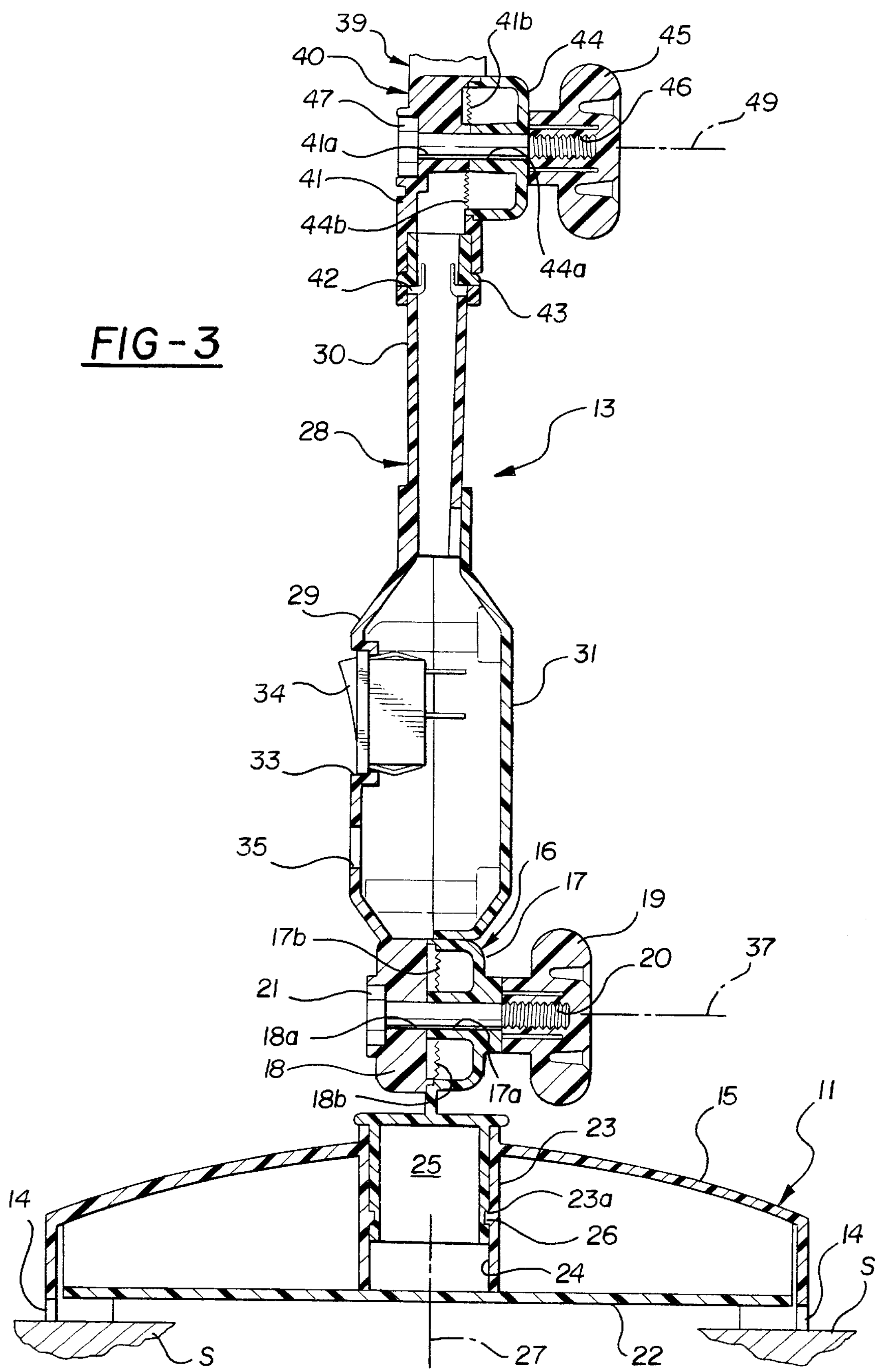
FIG. 3 is a cross-sectional view of a lower portion of the light apparatus shown in FIGS. 1 and 2.

There is shown in FIGS. 1 through 4 an articulating arm light assembly 10 including a surface engaging base 11, a lamp head 12 and an articulated arm 13 supporting the lamp head above the base. The base 11 extends in a generally horizontal plane and has a plurality of short legs 14 extending downwardly from corners for engaging a surface such as a top of a desk, work table or hobby bench. Mounted in a center of a convex upper surface 15 of the base 11 is a base adapter 16 having a first lower connector portion 17. The first lower connector portion 17 cooperates with a second lower connector portion 18 provided at a lower end of the arm 13 to form a first joint. A first knob 19 has a threaded aperture 20 (FIG. 3) receiving the threaded end of a bolt 21 extending through apertures 17*a* and 18*a* in the connector portions 17 and 18 respectively. The base 11, the base adapter 16 and the knob 19 can be made from any suitable materials such as ABS plastic for the base, and nylon for the base adapter and the knob.

The base 11 is hollow having an open bottom closed by a cover plate 22 that can be made of, for example, steel. A tubular wall 23 extends downwardly from the surface 15 and is open at both ends to form an aperture 24 for receiving a tubular extension 25 extending downwardly from the first lower connector portion 17. The extension 25 has an annular groove 26 formed on an outer surface adjacent a lower end. At least one of the base 11 and the adapter 16 is made of a suitable resilient material such that the groove 26 receives by a snap fit an annular flange 23*a* extending from an inner surface of the wall 23. When thus assembled, the base 11 and the base adapter 16 can be rotated relative to one another about a common longitudinal axis 27.

The arm 13 includes a lower arm section 28 having an elongated switch enclosure 29 with a lower end connected to the second lower end connector portion 18 and an upper end connected to a lower end of a lower shaft 30. The enclosure 29 is open adjacent the knob 19 which opening is closed by a removable cover 31 attached by a plurality of threaded fasteners 32. A switch aperture 33 is formed in a wall of the enclosure 29 to retain a rocker type electrical switch 34 for turning the light 10 on and off. A cord aperture 35 is formed below the switch aperture 32 for the passage of an electrical power cord 36 connected to the switch 34 in a known manner (not shown). The knob 19 can be rotated to loosen the frictional connection between the portions 17 and 18 thereby permitting the lower arm section 28 to be rotated about an axis 37 as indicated by a double-headed arrow 38. When the lower arm 28 has been selectively moved to a desired position, it can be locked in place by tightening the knob 19 to clamp the connector portions together. Each of the portions 17 and 18 has a respective plurality of teeth 17*b* and 18*b* that cooperatively engage when the knob 19 is tightened to prevent relative rotation. The lower arm section 28 and the cover 31 can be made from any suitable material such as nylon.

The arm 13 also includes an upper arm section 39 that is attached to the lower arm section 28 by a middle connector 40. An upper end of the lower shaft 30 is received in a tubular extension of a first middle connector portion 41 of the connector 40. The extension of the portion 41 has a pair of opposed annular slots 42 formed in the wall thereof for retaining a cooperating pair of tabs 43 formed on an outer surface of the shaft 30. The first middle connector portion 41 cooperates with a second middle connector portion 44 provided at a lower end of the section 39 to form a second joint. A second knob 45 has a threaded aperture 46 receiving the threaded end of a bolt 47 extending through apertures 41*a* and 44*a* in the connector portions 41 and 44 respectively. The upper arm section 39 has an upper shaft 48 with the second middle connector portion 44 connected at a lower end thereof and an upper end connected to the lamp head 12. The knob 45 can be rotated to loosen the frictional connection between the portions 41 and 44 thereby permitting the upper arm section 39 to be rotated about an axis 49 as indicated by a double-headed arrow 50. When the upper arm 39 has been selectively moved to a desired position, it can be locked in place by tightening the knob 45 to clamp the connector portions together. Each of the portions 41 and 44 has a respective plurality of teeth 41*b* and 44*b* that cooperatively engage when the knob 45 is tightened to prevent relative rotation. The upper arm section 39 and the knob 45 can be made from any suitable material such as nylon.

The upper shaft 48 is attached to an upper connector 51. The upper end of the upper shaft 48 is received in a tubular extension formed by a first upper connector portion 52 and a second upper connector portion 53 of the connector 51. The connector portions 52 and 53 are attached by a plurality of fasteners 54 and define an annular channel 55 that retains a plurality of radially extending teeth 56 on the upper end of the upper shaft 48 permitting relative rotation between the upper connector 51 and the upper shaft 48. A radially inwardly extending detent 57 is provided in the channel 55 in the connector portion 53 to engage the teeth 56 thereby defining one less stop position than the number of the teeth 56 for rotation of the lamp head 12 about a longitudinal axis 58 of the upper shaft 48. The upper connector 51 can be made from any suitable material such as polycarbonate.

A third knob 59 has a threaded aperture 60 receiving the threaded end of a stud 61 extending through an aperture 53*a* in the connector portion 53. The stud 61 is attached to a hollow body 62 of the lamp head 12. The knob 59 can be rotated to loosen the frictional connection between the portion 52 and the body 62 thereby permitting the lamp head 12 to be rotated about an axis 63 as indicated by a double-headed arrow 64. When the lamp head 12 has been selectively moved to a desired position, it can be locked in place by tightening the knob 59 to clamp the connector portions together. Each of the portion 52 and the lamp head 12 has a respective plurality of teeth 52*b* and 12*b* that cooperatively engage when the knob 59 is tightened to prevent relative rotation. The knob 59 can be made from any suitable material such as nylon.

Figure 4:
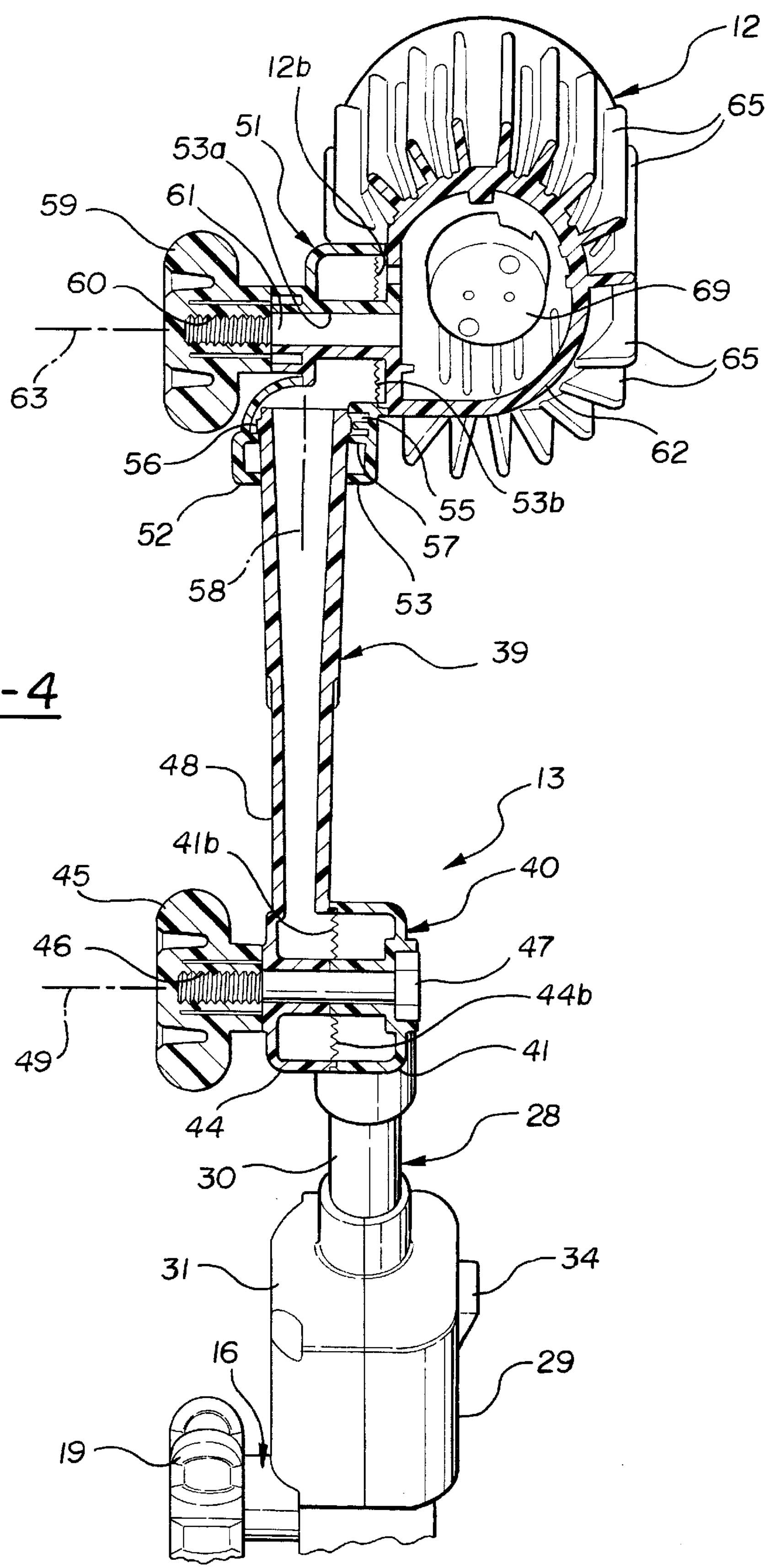
FIG. 4 is a cross-sectional view of an upper portion of the light apparatus shown in FIGS. 1 and 2.

The body 62 of the lamp head 12 has a generally tubular shape with a plurality of longitudinally and radially extending fins 65 on an outer surface thereof. An open front end of the body 62 is closed by a transparent lens 66 held in place by an annular bezel 67. The bezel 66 67 is attached to the body 62 by a pair of fasteners 68. As shown in FIG. 4, a lamp socket 69 is mounted in the hollow interior of the body 62 for retaining a lamp (not shown) aimed at the lens 66. The body 62, the lens 66 and the bezel 67 can be made from any suitable material such as polycarbonate.

Figure 5:
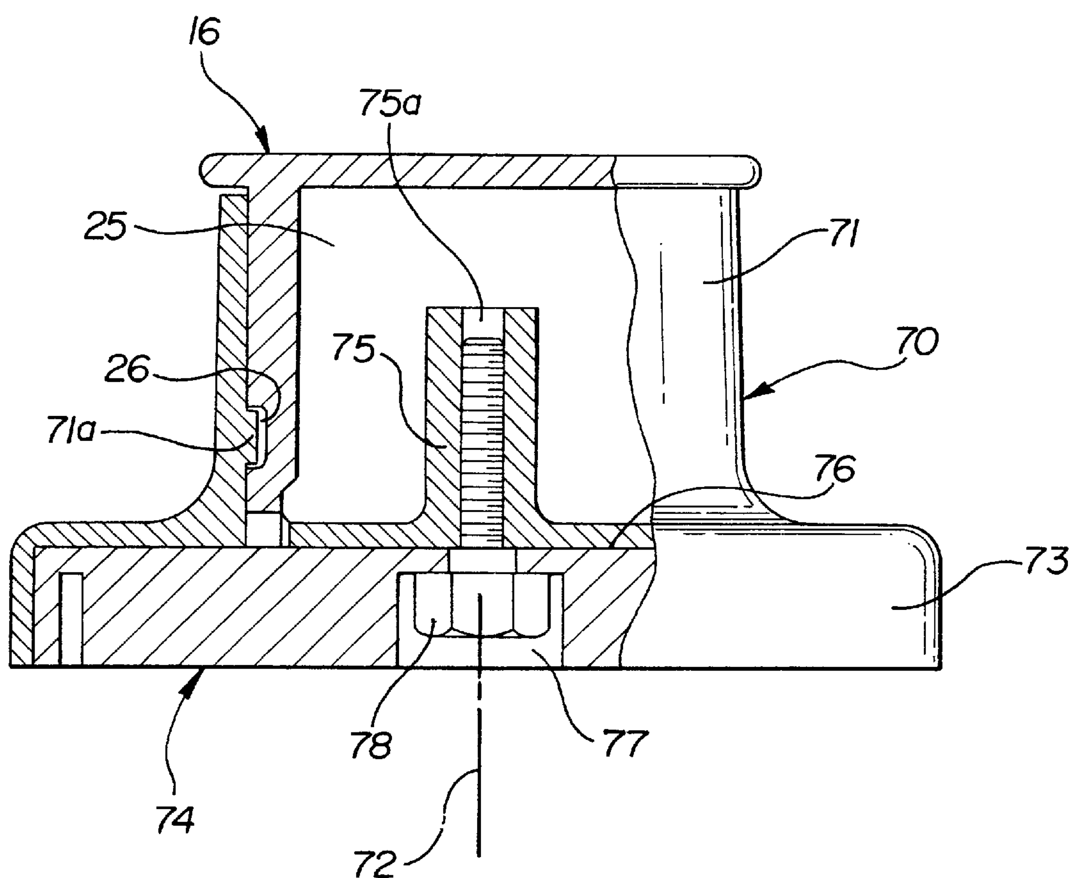
FIG. 5 is a front elevation view in partial cross section of an alternate base for the light apparatus shown in FIGS. 1–4.

There is shown in FIG. 5 an alternate embodiment base 70 for magnetically mounting the articulating arm light 10 on a surface. The base 70 can be made of any suitable material, ABS plastic for example, and includes a generally tubular top portion 71 having a segmented annular flange 71*a,* such as two opposed segments, extending from an inner surface of the wall thereof. An open upper end of the top portion 71 receives the extension 25 of the base adapter 16. As described above, the extension 25 has the annular groove 26 formed on the outer surface. At least one of the base 70 and the adapter 16 is made of a suitable resilient material such that the groove 26 receives the flange 71*a* by a snap fit. When thus assembled, the base 70 and the base adapter 16 can be rotated relative to one another about a common longitudinal axis 72. The top portion 71 joins a larger diameter bottom portion 73 open at a bottom end for receiving a disk magnet 74. The base 70 has a central tower 75 extending upwardly from a radially extending wall 76 at the junction of the top portion 71 and the bottom portion 73. The tower 75 and the wall 76 have an aperture 75*a* formed therethrough aligned with the axis 72. The magnet 74 has a stepped aperture 77 formed therein aligned with the aperture 75*a* for recessing a head of a fastener 78 threadably retained in the aperture 75*a*. The magnet 74 permits the base 70, the lamp head 12 and the articulated arm 13 to be mounted on any surface to which the magnet is magnetically attracted.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A light apparatus comprising:

a base adapted to engage a planar support surface;

a lower arm section having a lower end rotatably attached to said base for selective rotation about a first axis generally perpendicular to a longitudinal axis of said lower arm section and having an upper end;

an upper arm section having a lower end rotatably attached to said upper end of said lower arm section for selective rotation about a second axis generally parallel to said first axis and having an upper end;

an upper connector rotatably attached to said upper end of said upper arm section for selective rotation about a third axis perpendicular to said second axis;

said upper arm section and said upper connector be rotatably attached by a detent means for selectively permitting relative rotation to each of a plurality or stop points; and a lamp head rotatably attached to said upper connector for rotation about a fourth axis generally parallel to said first axis.

2. The light apparatus according to claim 1 wherein said base has a plurality of feet adapted to contact a support surface.

3. The light apparatus according to claim 1 wherein said base includes a disk magnet for magnetic attachment to a support surface.

4. The light apparatus according to claim 1 wherein said lower arm section includes a switch enclosure and an electrical switch adapted to be connected to a power cord.

5. A light apparatus comprising:

a base adapted to engage a planar support surface;

a base adapter rotatably mounted on said base For rotation about a base axis;

a lower arm section having a lower end rotatably attached to said base adapter for rotation about a first axis generally perpendicular to said base axis and having an upper end;

an upper arm section having a lower end rotatably attached to said upper end of said lower arm section for rotation about a second axis generally perpendicular to said base axis and having an upper end;

an upper connector rotatably attached to said upper end of said upper arm section for rotation about a third axis perpendicular to said second axis;

said upper arm section and said upper connector being rotatably attached by a detent means for selectively permitting relative rotation to each of a plurality of stop points; and a lamp head rotatably attached to said upper connector for rotation about a fourth axis generally perpendicular to said base axis.

6. The light apparatus according to claim 5 wherein said base has a plurality of feet adapted to contact the support surface.

7. The light apparatus according to claim 5 wherein said base includes a disk magnet for magnetic attachment to the support surface.

8. The light apparatus according to claim 5 wherein said base adapter and said lower arm section are rotatably attached by a lower connector means for selectively permitting relative rotation about said seeded first axis.

9. The light apparatus according to claim 5 wherein said lower arm section and said upper arm section are rotatably attached by a middle connector means for selectively permitting relative rotation about said second axis.

10. The light apparatus according to claim 5 wherein said upper connector and said lamp head are rotatably attached by an upper connector means for selectively permitting relative rotation about said fourth axis.

11. The light apparatus according to claim 5 wherein said lower arm section includes a switch enclosure and an electrical switch adapted to be connected to a power cord.

12. A light apparatus comprising:

a base adapted to engage a planar support surface;

a base adapter rotatably mounted on said base for rotation about a base axis;

a lower arm section having a lower end rotatably attached to said base adapter by a lower connector for selective rotation about a first axis generally perpendicular to said base axis and having an upper end;

said lower arm section including a hollow switch enclosure having an opening closed by a removable cover;

an upper arm section having a lower end rotatably attached to said upper end of said lower arm section by a middle connector for selective rotation about a second axis generally perpendicular to said base axis and having an upper end;

an upper connector rotatably attached to said upper end of said upper arm section for selective rotation about a third axis perpendicular to said second axis; and a lamp head rotatably attached to said upper connector for rotation about a fourth axis generally perpendicular to said base axis.

13. The light apparatus according to claim 12 wherein said first connector, said second connector and said third connector each has first and second connector portions with cooperating teeth for preventing relative rotation when said first and second portions are clamped together.

14. The light apparatus according to claim 13 wherein said first connector, said second connector and said third Connector each include a knob threadably engaging a bolt for clamping said first and second connector portions together.

* * * * *